United States Patent [19]

Kwiatkowski et al.

[11] Patent Number: 4,952,145

[45] Date of Patent: Aug. 28, 1990

[54] APPARATUS FOR THE HEAT TREATMENT AND/OR DRYING OF A WEB OF MATERIAL PASSING CONTINUOUSLY THROUGH

[75] Inventors: Kurt v. Kwiatkowski, Bonn; Erich Gorissen; Udo Unger, both of Leichlingen, Fed. Rep. of Germany

[73] Assignee: Vits Maschinenbau GmbH, Langengeld, Fed. Rep. of Germany

[21] Appl. No.: 334,635

[22] Filed: Apr. 6, 1989

[30] Foreign Application Priority Data

Apr. 7, 1988 [DE] Fed. Rep. of Germany ....... 3811620

[51] Int. Cl.$^5$ .............................................. F27B 9/28
[52] U.S. Cl. ...................................... 432/59; 432/175; 432/209; 34/41; 34/46; 126/92 AC
[58] Field of Search ................. 34/4, 41, 23, 155, 156; 126/92 AC; 432/8, 59, 175, 209

[56] References Cited

U.S. PATENT DOCUMENTS 4,498,864 2/1985 Roth et al. .............................. 432/8

Primary Examiner—Henry A. Bennet
Assistant Examiner—John Sollecito
Attorney, Agent, or Firm—Sprung Horn Kramer & Woods

[57] ABSTRACT

The invention relates to an apparatus for the heat treatment and/or the drying of a web of material 1 passing continuously through. In this case the web of material 1 is treated on one or both sides with infrared radiation. The infrared radiators 6, 7 can be adjusted in their radiation capacity over the width of the web of material 1 by being heated by a plurality of individual hot-gas streams which are guided parallel to the web of material 1, can be adjusted to differing temperatures or can sweep at differing flow rates over the rear sides of radiating plates 6a, 7a of the infrared radiators 6, 7.

17 Claims, 9 Drawing Sheets

APPARATUS FOR THE HEAT TREATMENT AND/OR DRYING OF A WEB OF MATERIAL PASSING CONTINUOUSLY THROUGH

BACKGROUND OF THE INVENTION

The invention relates to an apparatus for the heat treatment and/or drying of a web of material, consisting of guiding and transporting means for the web of material, of infrared radiators, which are arranged on one of both sides of the web of material at a distance from it and extending over its width and in its longitudinal direction and which can be heated by ducts which are arranged on the rear sides of its radiating plates, have heating medium flowing through them and are adjustable in heating capacity.

It is known to dry webs of material in continuous driers operated with heated air. It is characteristic of this drying that large volumes of air are blown onto the web of material and circulated in the drier housing. In order that the web of material is not adversely affected in its quality by this air blown onto it, the air must be absolutely free from even the smallest foreign bodies. Although this type of drying allows high drying capacities, it also entails disadvantages due to the large volumes of air. Due to the large volumes of air, the parts processing these volumes of air, such as cleaning apparatuses, blowers and the like, must be made correspondingly voluminous.

In order to obviate these difficulties, processes and apparatuses of the type mentioned at the beginning are known in which the exposure to heat of the web of material required for the heat treatment and/or drying takes place by the radiation from infrared radiators.

In the case of a known apparatus of this type (DE 19 19 957 C2), the infrared radiators consist of radiating plates which are heated directly by burners operated with gas and the infrared radiation of which is made uniform by screens arranged between them and the web of material.

In the case of another apparatus of the same generic type (EP 0 157 403 A3), the infrared radiators consist of plates which bear, on their side facing away from the material web, lines, for example for a thermal oil, laid in a snaking form. In order to be able to expose the web of material to a differing radiation capacity over its width, a plurality of line lengths laid in a meandering form are arranged parallel to one another and to the running direction of the web of material. Such an apparatus designed for heating with thermal oil requires a great expenditure in terms of apparatus engineering. A particularly sensitive temperature control cannot be achieved with lines which are laid in a meandering form and through which thermal oil flows.

Finally, infrared radiators for drying ovens are known (DT 1 604 766 A1) of which the radiating element is heated by hot gases conducted over its rear side. In this case, a chamber which is uniform over the entire width of the radiating element is provided for the conduction of the hot gases. In order to be able to effect a differing radiation capacity over the radiating surface in the event of a differing heat requirement, there is provision for influencing the flow rate of the hot gases through the channel taken along the radiating element by means of differing cross-sections. However, due to the then fixed cross-sections, a changing of the thermal radiation of the individual regions of the radiating element in operation is not possible.

SUMMARY OF THE INVENTION

The invention is based on the object of creating an apparatus of the type mentioned at the beginning which makes possible in operation a sensitive adaptation of the radiation capacity to the respective width of the web of material to be treated.

This object is achieved according to the invention by the fact that the ducts are designed as hot-air ducts and a plurality of such hot-air ducts are provided parallel to one another and running in the passing-through direction of the web of material and in that the hot-air ducts are assigned control means, with which the flow rate and/or the temperature of the hot air in the individual hot-air ducts is adjustable, and/or are assigned heating devices or cooling devices, which are arranged on their rear sides and are adjustable in their heating and cooling capacity.

In the case of the invention, unlike in the case of the apparatuses for the heat treatment and/or drying of a web of material passing continuously through according to the prior art, the heating of the infrared radiators does not take place by direct exposure of the radiating plates to the burner gases (DE 19 19 957 C2) or by a thermal oil which can be heated to high temperatures (EP 0 157 403 A3), but by hot air. The dividing of the hot air into a plurality of parallel hot-gas streams makes it possible to adapt sensitively to the temperature requirements differing over the width of the web of material, so that the web of material is heat-treated or dried uniformly over the width. The heating of the infrared radiators by the hot-gas streams brings the further advantage that, with the hot-gas streams in the ducts, an additional regulating variable is obtained, which makes possible a very sensitive adjustment of the temperature of the infrared radiator over the width and also over the length, since the heating and cooling elements arranged on the rear side allow the radiation capacity of the infrared radiators to be adjustable not only over the width, but also over the length. The heat flow given off by the hot-gas streams to the infrared radiators can namely be maintained or even intensified by reheating of the hot-gas streams. With this reheating, allowance is made for the fact known from practice that hot-gas streams quickly give off their heat content to the infrared radiators and cool. Consequently, if it is wished to realise air-heated infrared radiators which have a radiation capacity which is equal over the length of the web of material, in special cases even an exactly influencable radiation capacity, this can be achieved with the heating elements arranged on the rear side, which can take various forms, as will be explained in detail below. In a corresponding way, the hot-gas streams can also be cooled if need be.

The invention also deliberately dispenses with thermal oil, since in some cases the thermal oil is extremely harmful and represents a considerable operating risk. Even small amounts of oil which escape from tiny pores may be sufficient to contaminate the air in the dryer to such an extent that an at least monomolecular layer covers the web of material to be dried. This often observed characteristic of high-boiling hydrocarbons leads to the surface of the web of material which is dried in an atmosphere containing oil vapour only being able to bond inadequately firmly to other webs, for example copper foils. The covering of the surface with hydrocarbon molecules namely acts as a release layer.

As soon as the web of material gives off volatile substances during the heat treatment and/or drying, it is necessary to remove them. For this purpose, a gas flow is preferably passed parallel to the web of material through the intermediate space between the web of material and the infrared radiator. For removal of the released substances, a gas which can be charged with the substances, in particular fresh air, should be conducted into the intermediate space, the said gas then being fed as exhaust air to an outlet. If the released volatile substances are recoverable solvents, an inert gas or an inert gas/oxygen mixture, which is to have such a low oxygen content that an explosion on mixing with the combustible solvents is reliably prevented, is preferably used for removal.

For controlling the radiation capacity in the case of hot-gas ducts arranged next to one another, individually operable valves are provided at the inlets and/or outlets of the hot-gas ducts. Alternatively or and/or outlets of the hot-gas ducts. Alternatively or additionally, the hot-gas ducts may be assigned heating devices and/or cooling devices upstream and/or downstream of the inlets, with which the hot gases can be heated and/or cooled.

According to one development of the invention, the reheating of the hot gases can be realized by heating devices, in particular infrared radiators, burners or heat exchangers acting on the rear walls of the hot-gas ducts. Conversely, the gases conducted through the ducts can also be cooled. This can take place by cooling air blown onto the rear walls or heat exchangers.

The radiating plate forming the front wall, but also the rear wall of the hot-gas duct or ducts is preferably formed by a closed wall, or in special cases by a fine-meshed screen and/or glass. If the front wall is formed by a closed wall, webs (ribs) of thermally conductive material, extending in the longitudinal direction through the hot-gas duct or ducts and connected thermally conductively to the front wall, may be provided. As a result, the transmission of the heat from the hot gases to the radiating front wall is improved. The transmission of the heat from the hot gases to the radiating front wall is particularly effective if the webs have a conical cross-section, the broader base of which is connected to the front wall. In special cases, the rear wall of the hot-gas ducts is itself thermally conductive and is connected thermally conductively to the webs. In this case, the hot-gas streams can be reheated by heating of the rear wall. This thermally conductive configuration is equally effective if cooling devices are employed.

According to a further development of the invention, a combustion chamber or a heat exchanger is provided for the heating of the hot-gas duct or ducts. The hot-gas duct or ducts are preferably in a hot-gas circuit with the combustion chamber or the heat exchanger. The combustion chamber or the heat exchanger may be used for heating the chargeable gases introduced into the intermediate space for the removal of volatile substances. This is possible in a simple way by a branch leading from the outlet of the combustion chamber or the heat exchanger to the inlet of the intermediate space, forming a duct, between the infrared radiators and the web of material. Alternatively, the inlet of the intermediate space, forming a duct, may be connected to a chamber, the chargeable gases of which, flowing through, are preheated or cooled by a burner or a heat exchanger.

To stabilize the guidance of the web of material in the intermediate space, according to a further development of the invention, blowing nozzles which act on the web of material are provided in the intermediate space.

With the apparatus according to the invention, a web of material can be heat-treated and/or dried optimally. As already stated, in certain cases it is advantageous to have a gas which is heated or cooled in a separate heat exchanger and is delivered by a separate blower passed through the intermediate space between the infrared radiators and the web of material. This is the case above all whenever special requirements are demanded of the purity and the temperature and the composition of the gas. The gas stream can be metered particularly carefully by means of the blower to be regulated separately. As a result, it is avoided for example that thin webs of material flutter of flap (so-called sailing effect).

If the volatile substances given off from the web of material in the heat treatment and/or drying are combustible solvents, there is the risk of explosion if gases containing air or oxygen are used. By the use of exhaust gases from combustion processes, of air which has been rendered inert or of inert gas as a purging medium, the risk of explosion is reduced and in the case of many solvents is already prevented, depending on the position of the explosion region. If the prices for the solvents are considerably above the oil prices or gas prices, a recovery is worthwhile. In such cases, the invention advantageously allows the use of inert gases ($N_2$, $CO_2$) as purging gases.

The solvents can be removed safely together with the inert gases in the separate circuit, since according to the invention the purging-air circuit is completely separate from the hot-gas circuit. Only where the web of material enters and leaves the treatment space are so-called buffer zones necessary, in which a mixture between purging gases and outside air is avoided by suitable devices.

In some applications it has been found that it is expedient to subject the web of material to infrared radiations of high (excitation) energy for heat treatment and/or drying. According to the invention, the following measures are taken for this purpose: for the treatment of the web of material with high-energy infrared rays, such as are given off by bright red-hot radiating plates, heating devices are used, for example gas-heated infrared radiators. This technique known per se, in which the infrared radiation of the radiating plates acts directly on the web of material, is modified and thereby improved decisively according to the invention by interposing between the red-hot radiating surface of the radiating plate of the infrared radiator, which has a temperature above the ignition temperature of the solvent, and the web of material, two hot-gas streams which can be regulated in a precisely defined manner, to be precise the gas stream between the web of material and the radiating plate and the hot-gas stream in the hot-gas ducts. If, for example, the front and rear limitations of the hot-gas ducts consist of a screen, for example of wire gauze, by adjustment of the individual hot-gas streams in the parallel running hot-gas ducts, the temperature profile over the width can be adjusted very precisely and temperature peaks (overheatings) in the direction in which the the web of material runs can be evened out. In the space between the web of material and the radiating plate, designed as a screen, according to the invention an exhaust gas or inert gas is conducted. If there is sensitive adjustment of the flow conditions in the space between the web of material and the radiating plate, designed as a screen, and in the hot-gas ducts, it can be reliably achieved that an ingress of large quantities of solvent through the screen forming the radiating plate and the rear wall, likewise designed as a screen, into the region of the surfaces kept at a high temperature is prevented. An arcing through the screen-like plates or walls is prevented if the screen is chosen with such a fine mesh that less than the quenching distance is maintained (principle of pit lamp).

Even if part of the high-energy infrared radiation is absorbed at the fine-mesh screens and is radiated at long wavelengths, altogether an incidence of high-energy infrared radiation is nevertheless to be found on the web of material. This incidence of high-energy infrared radiation can be made uniform both in the width and over the length of the web of material considerably better by the idea of the invention, considerably reducing the risk of explosion.

With numerous products it has proved appropriate for a heat treatment and/or drying at high temperature to be followed by a zone of so-called tempering at a somewhat lower temperature. This may be performed on the one hand by the gas stream being introduced between the web of material and infrared radiators in a cooled state. If, however, it is wished to avoid with certainty possible condensation processes which may occur at the surfaces of the web of material, it is expedient to treat the web of material with infrared radition at a very long wavelength in its continuation between infrared radiators. As a result, the desired reactions of the heat treatment are achieved without condensations having to be feared. A combination of the two procedures has proved expedient.

The invention is explained in more detail below with reference to a drawing, in which specifically:

DETAILED DESCRIPTION OF THE INVENTION

Figure 1:
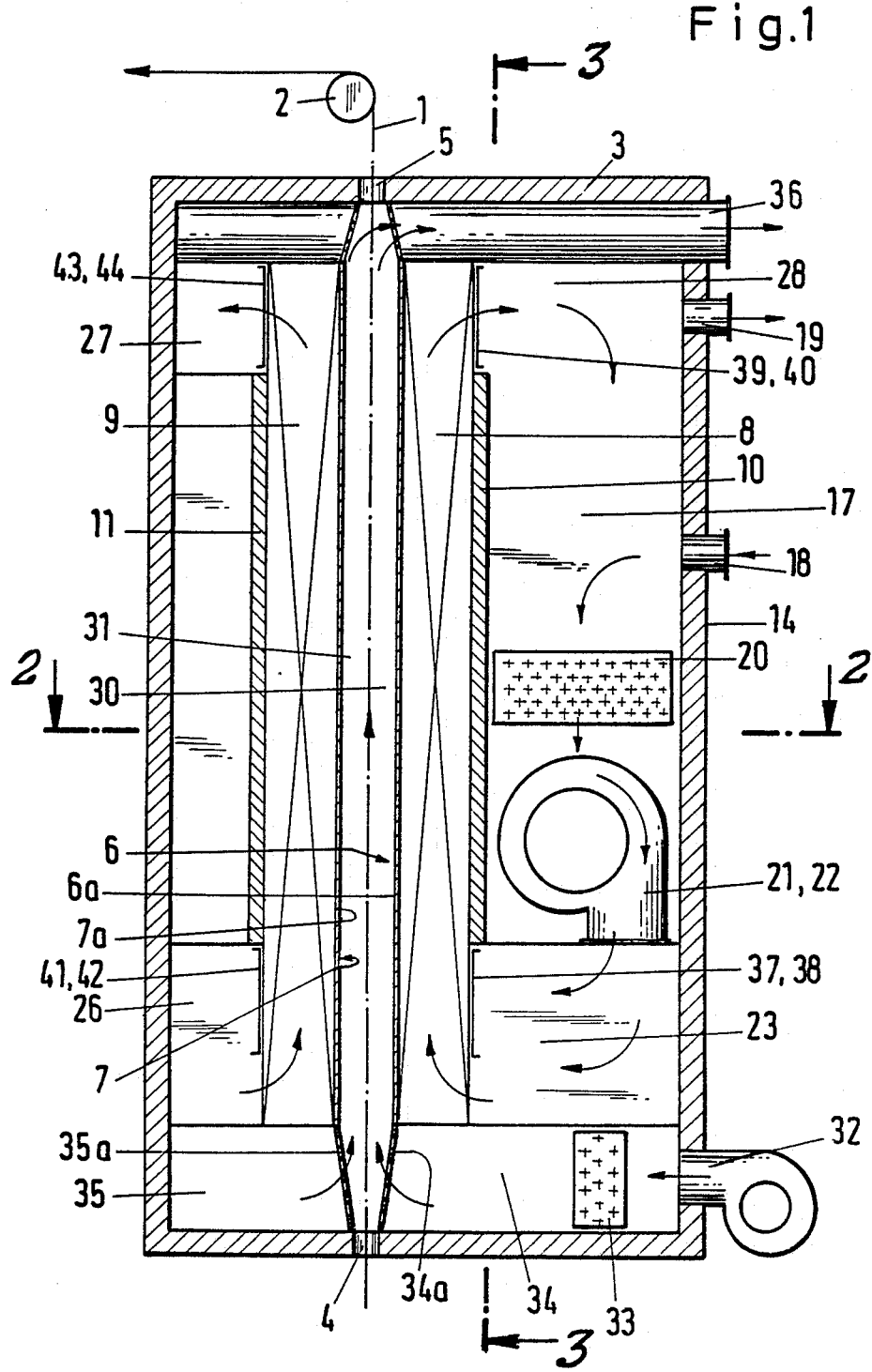
FIG. 1 shows a part of an apparatus for the heat treatment or drying of a web of material passing continuously through, in longitudinal section.

The apparatus for the heat treatment of a web of material 1 according to FIG. 1 has guiding and transporting means for the web of material 1, of which here only an upper deflection roller 2 is shown, a housing 3 with an inlet slit 4 and an outlet slit 5 for the web of material 1 and infrared radiators 6, 7, arranged in the housing 3 on both sides of the web of material 1.

Figure 2:
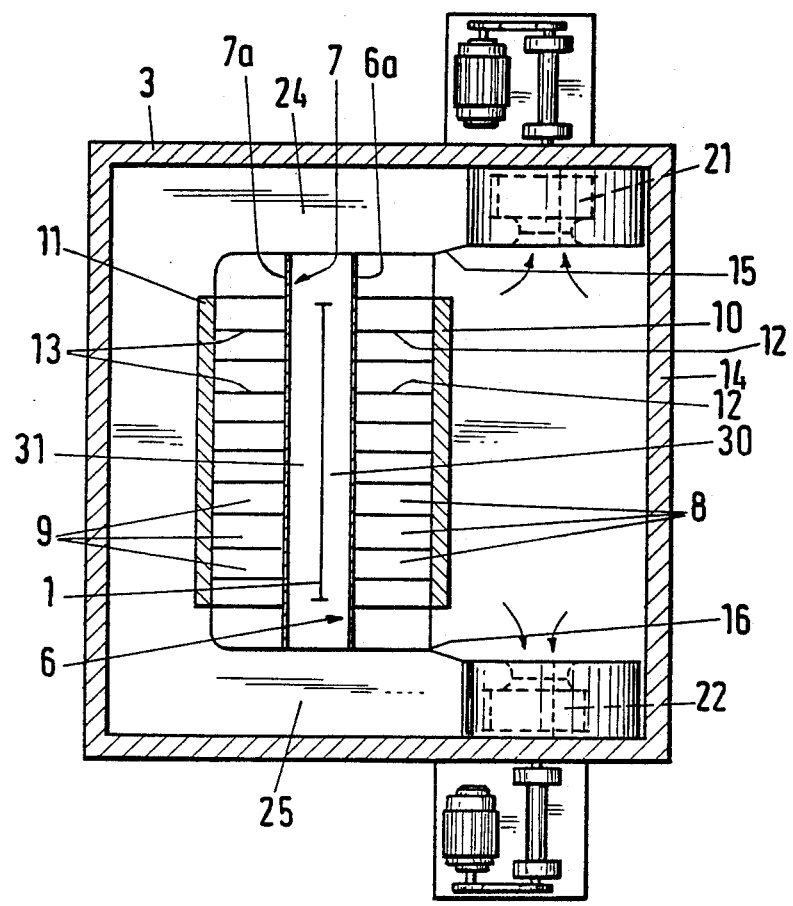
FIG. 2 shows the part represented in FIG. 1 in cross-section along line A—A of FIG. 1.

The infrared radiators 6, 7 extend in the longitudinal direction of the web of material 1 and are arranged at a distance from it. Each infrared radiator 6, 7 has a radiating plate 6a, 7a in the form of a metal, of a metal with special treated surface, of a special glass or of a fine-meshed screen. This radiating plate 6a, 7a or the like bounds on its rear side, facing away from the web of material 1, a plurality of hot-gas ducts 8, 9, parallel to one another and extending in the longitudinal direction of the web of material 1. The rear walls of the hot-gas ducts 8, 9 are bounded by plates 10, 11, which may be made, according to purpose, insulating or well thermally conducting or in the form of a glass or a narrow meshed screen. The dividing walls 12, 13, which divide the hot-gas ducts 8, 9 from each other according to FIG. 2, preferably consist of thermally conductive material and are connected thermally conductively to the frontal radiating plates 6a, 7a and/or to the thermally conductive plates 10, 11. As a result, on the one hand, the transmission of heat from the medium flowing through the hot-gas ducts 8, 9 onto these radiating plates 6a, 7a is improved and on the other hand the transmission of heat indirectly from the heated or cooled plates 10, 11 via the medium onto the radiating plates 6a, 7a and directly via the dividing walls 12, 13 is improved.

The rear wall 10 forms with an opposite wall 14 of the housing 3, and side walls 15, 16 lying in the housing 3, a chamber 17, into which fresh air is introduced via an inlet 18 and exhaust air is conducted away via an outlet 19. The atmosphere of the chamber 17 can be heated by a heat exchanger 20, the hot gases of which are fed by means of blowers 21, 22 via a distributor space 23 to the hot-gas ducts 8 and via ducts 24, 25 and a distributor space 26 to the hot-gas ducts 9.

Once the hot gases have flowed through the hot-gas ducts 8, 9 they are conducted via collecting spaces 27, 28 and ducts which are not shown back into the chamber 17.

In order to remove the substances which have become volatile during drying in intermediate spaces 30, 31 between the web of material 1 and the infrared radiators 6, 7, fresh air is conducted via a fresh air inlet 32 by means of a blower, via a heat exchanger 33, into distributor spaces 34, 35, from which the hot gases then pass via distribution screens 34a, 35a into the intermediate spaces 30, 31. These hot gases take up the substances which have become volatile and remove them via an exhaust gas outlet 36.

Figure 3:
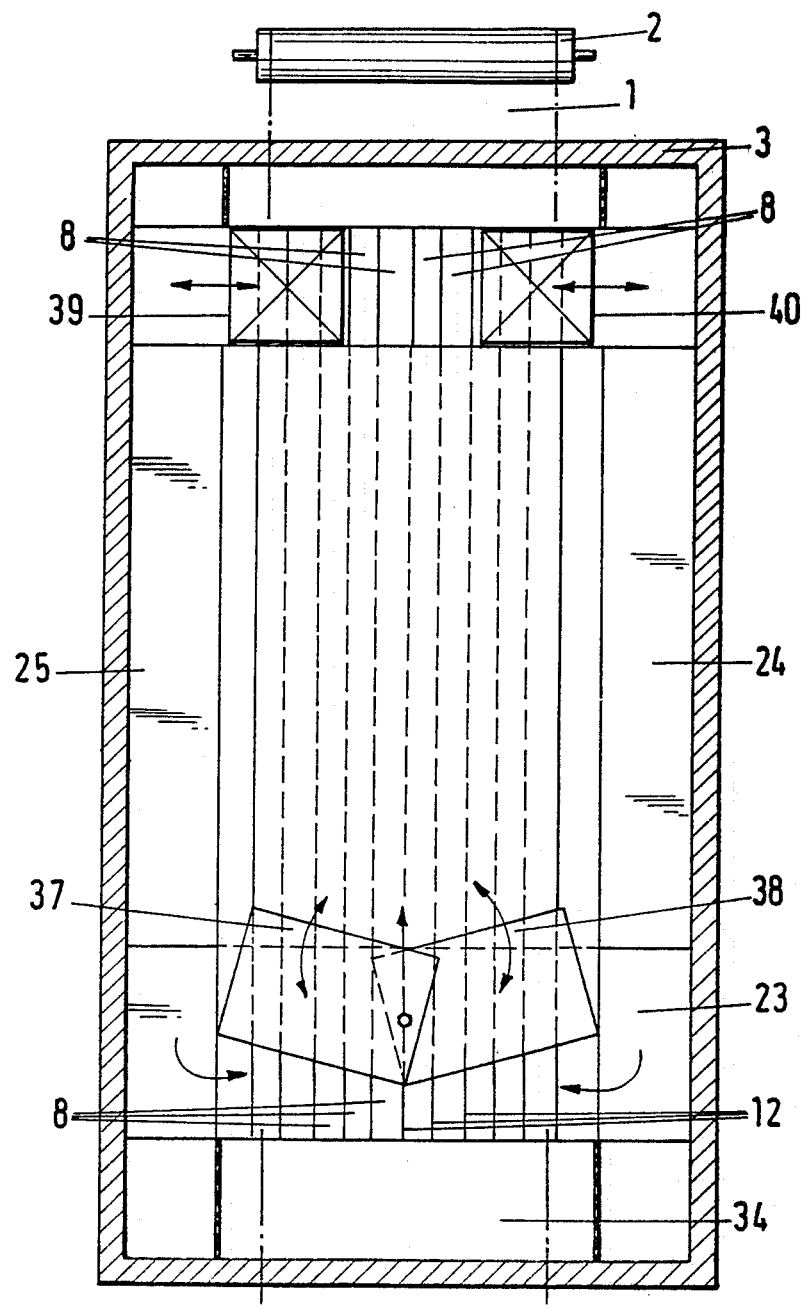
FIG. 3 shows the part represented in FIG. 1 in longitudinal section along the line B—B of FIG. 1.
Figure 4:
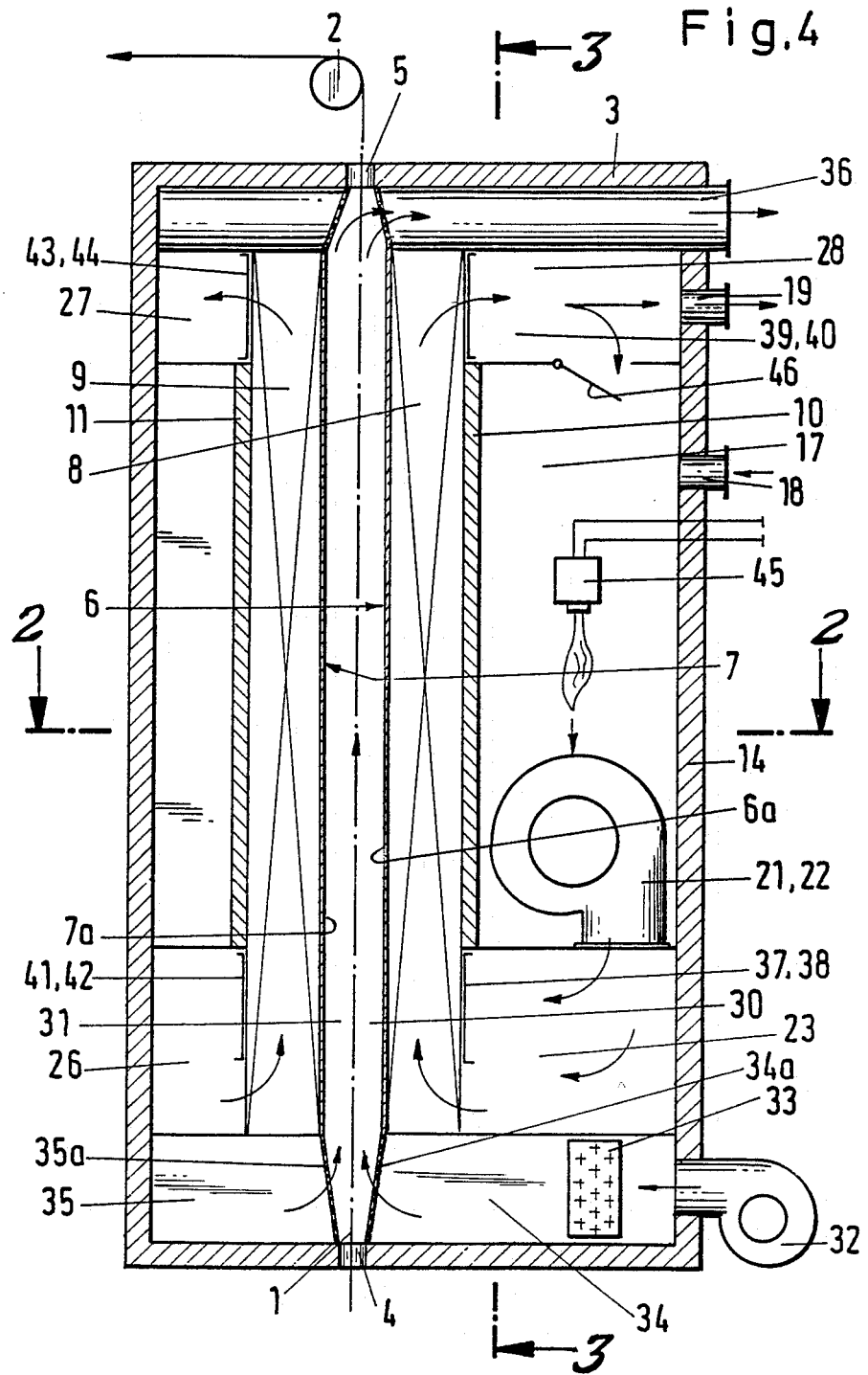
FIG. 4 shows a part, modified from FIG. 1, of an apparatus for the heat treatment or drying of a web of material passing continuously through, in longitudinal section.

As FIGS. 3 and 4 show, valve flaps or valve slides 37–40 are provided both at the inlets, shown at the bottom, of the hot-gas ducts 8 and at the outlets, shown at the top, of the hot-gas ducts 8, with which flaps or slides the hot-gas ducts 8 can be closed off fully or partially. Corresponding valve flaps 41–44 are also provided for the hot-gas ducts 9. By means of these valve flaps or valve slides 37–44, it is possible to control the volume per unit of time or the rate of the hot gases flowing through the hot-gas ducts 8,9 and consequently to control the radiation capacity of the infrared radiators 6, 7 over their width.

In cases where, unlike in the case of the exemplary embodiment of FIGS. 3 and 4, such valve slides 37–44 are not provided, but also additionally, the temperature of the hot gases, and consequently also the radiation intensity of the infrared radiators 6, 7 over their width can be controlled by the hot gases being heated to differing degrees over the width from the rear side of the hot-gas ducts 8, 9. This is possible, for example, by means of individual burners which act upon the rear wall of the hot-gas ducts 8, 9 in this case a thermally conductive rear wall, and can be put into operation individually or in groups in order to heat the hot-gas ducts individually or in groups. These burners may also serve for the reheating if they are offset in the running direction of the web of material 1.

The exemplary embodiment of FIG. 4 differs from that of FIG. 1 in that a burner 45 is provided instead of a heat exchanger 18. With use of a premixing burner, the oxygen content of the circulating hot gases can be regulated within broad limits. Another difference is that the collecting spaces 26, 28 are not open towards the chamber 17, designed as a combustion chamber, but are only connected to the combustion chamber 17 via an adjustable flap 46. The adjustable flap 46 and the pressure conditions at the inlets and outlets 18, 19 allow the ratio of circulating air to exhaust air to be adjusted. This possibility of adjusting the ratio of circulating air to exhaust air is advantageous in particular whenever the dryer is operated with air which has been rendered inert or with exhaust gas for the purpose of enrichment and recovery of solvents.

Figure 5:
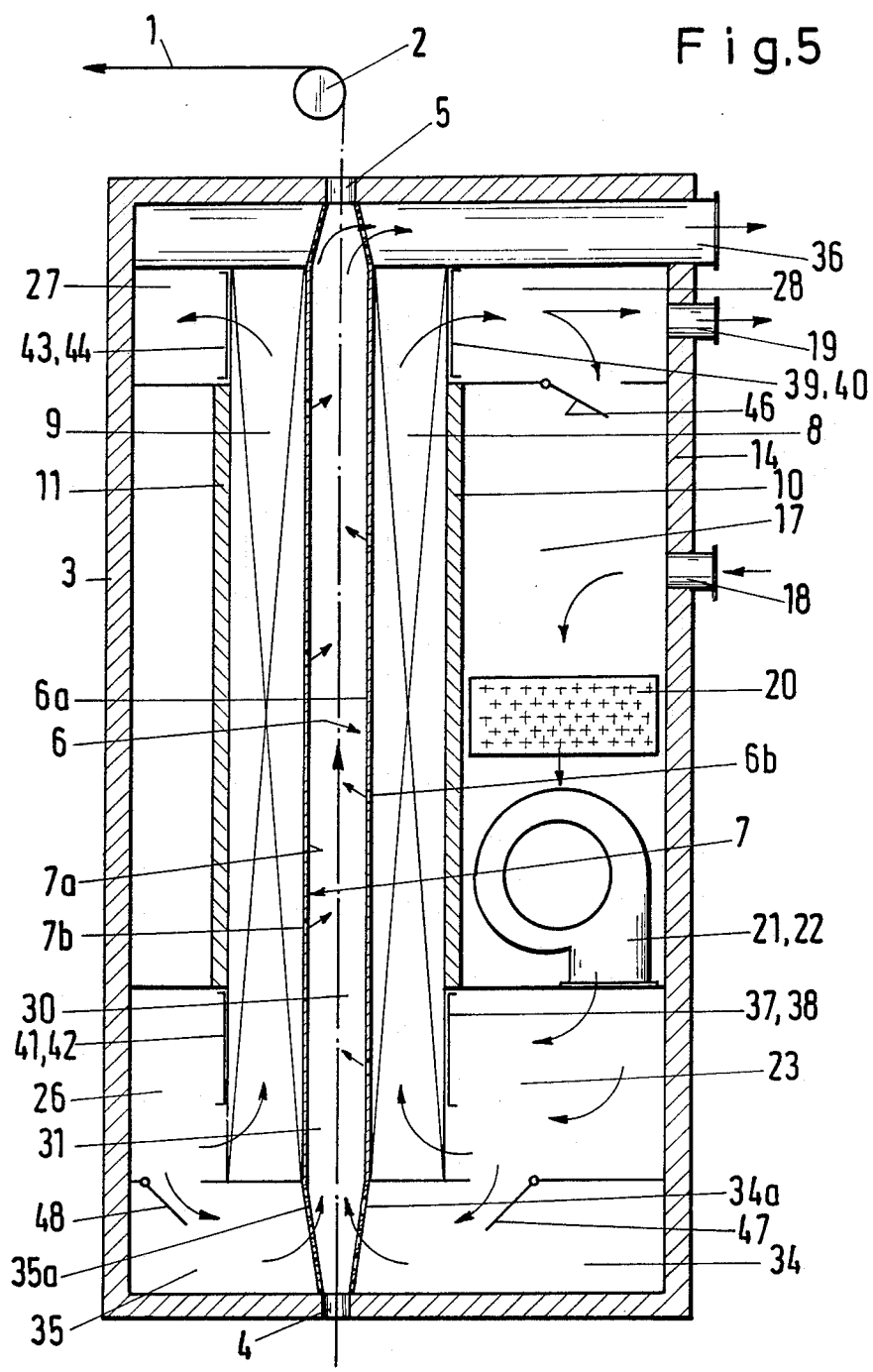
FIG. 5 shows a part, modified from FIG. 1 and FIG. 2, of an apparatus for the heat treatment or drying of a web of material passing continuously through, in longitudinal section.

The exemplary embodiment of FIG. 5 differs from the exemplary embodiments of FIGS. 1 to 4 in that, instead of the fresh-air inlet 32 with the blower and the heat exchanger 33 for heating the air to be conducted into the intermediate spaces 30, 31, the distributor spaces 34, 35 are connected via adjustable flaps 47, 48 to the distributor spaces 24, 26. Another difference is that, in the radiating plates 6a, 7a of the infrared radiators 6, 7 there are provided nozzle openings 6b, 7b, from which blown jets of hot air, directed obliquely against the web of material 1, emerge. The blown jets are made uniform and are directed by the nozzles fitted on the nozzle openings but not shown in the drawing. These nozzles may be operated in a way known per se by independent air feeding.

Figure 6:
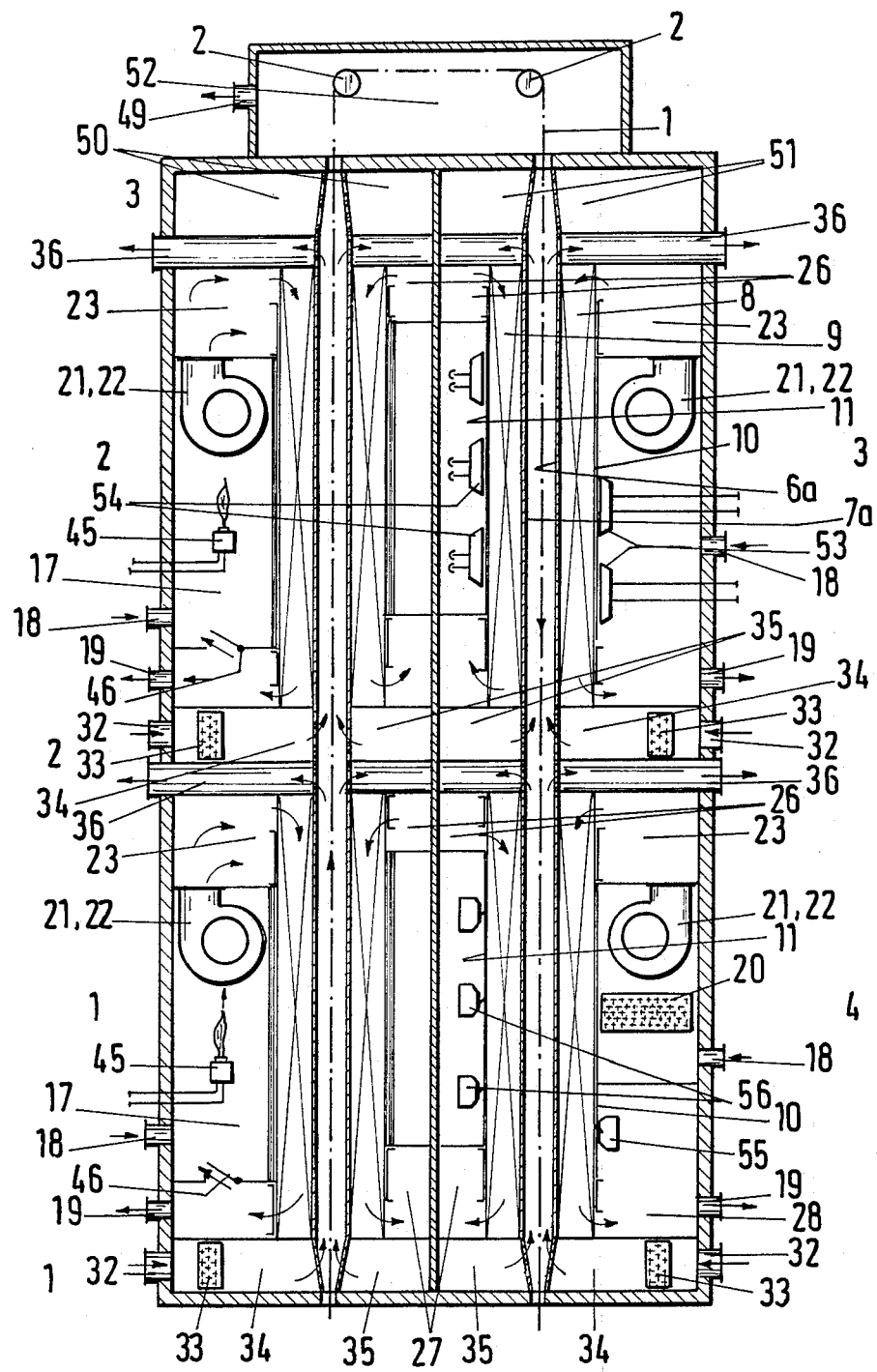
FIG. 6 shows an apparatus, consisting of several parts, for the heat treatment or drying of a web of material passing continuously through in longitudinal section.

In the case of the exemplary embodiment of FIG. 6, the zones of a vertical dryer for a web of material 1 are formed with one upwardly leading and one downwardly leading strand of the web of material, of the various exemplary embodiments described, in order to heat-treat and/or dry the web of material optimally on its way through the dryer.

In the zones 1 and 2, according to the exemplary embodiment of FIG. 4, dryers are provided, with which the circulating medium is heated by a burner 45. At a buffer zone 1, air in particular hot air, is fed into the intermediate spaces 30, 31 via the freshair inlet 32 and the heat exchanger 33, completely separately from the circulating gaseous medium. At a buffer zone 2, the separation of zones 1 and 2 in terms of flow is accomplished by suction-removal of the hot air charged with substances which have become volatile from these intermediate spaces 30, 31 of the zone 1 and by introduction of air, in particular hot air, into the intermediate spaces 30, 31 of the zone 2. This separation succeeds with a coordination of the air streams of zones 1 and 2 fed in via the inlets 32 and fed out via the outlet 36, respectively.

In a buffer zone 3, the zone 2 is separated in terms of flow from the deflection zone 52 by suction-removal of exhaust air via the outlet 49 and introduction of air from the deflection zone 52 in compensating chambers 50, 51. In the deflection zone 52, the web of material 1 is led over deflection rollers.

The infrared radiators 6, 7 employed in zone 3 for the heat treatment and/or drying of the web of material 1 differ from the infrared radiators 53, 54 of the other exemplary embodiments shown, which are heated exclusively by the hot gas flowing through the ducts, to the extent that the plates 10, 11 of the hot-gas ducts 8, 9 are additionally heated by high-energy infrared radiation, which is generated for example by gas-heated infrared radiators 53, 54. If the radiating plates 6a, 7a and the rear walls 10, 11 of the infrared radiators 6, 7 consist of thermally conductive material and if the radiating plates 6a and 7a and the rear walls 10, 11 are connected thermally conductively via thermally conductive dividing walls 12, 13, an evenly high radiator temperature can be maintained over the length of the infrared radiators 6, 7 in the direction of the web of material. If both the radiator plates 6a, 7a and the plates 10, 11 consist of infrared-transmitting glass or fine-meshed screens, a large part of the high-energy infrared radiation of the infrared radiators 53, 54 will fall directly on the web of material 1 and influence the web of material 1 in the desired way. The sensitive adjusting of the flow conditions in the hot-gas ducts 8, 9 in conjunction with the gas-heated infrared radiators 53, 54 allow a very precise radiation and distribution to be realized over the width and length on the web of material 1.

The apparatus in the zone 4 corresponds essentially to that of the exemplary embodiment of FIG. 1, although here a cooling zone is employed. Cold gas is blown into the hot-gas ducts of the infrared radiators 6, 7, which gas heats up on its way in or counter to the running direction of the web of material. The cooling nozzles 55, 56 attached to the thermally conductive rear walls 10, 11 of the infrared radiators 6, 7 allow the gas flowing in the ducts 8, 9 to be cooled over and over from the rear side, so that the desired cooling effect in the direction of the run of the web of material 1 can be adjusted. To support this effect, if need be a cooled gas is likewise introduced into the intermediate spaces 30, 31, which gas additionally removes volatile substances which may be released and prevents a condensation of the same on the web of material.

Figure 7:
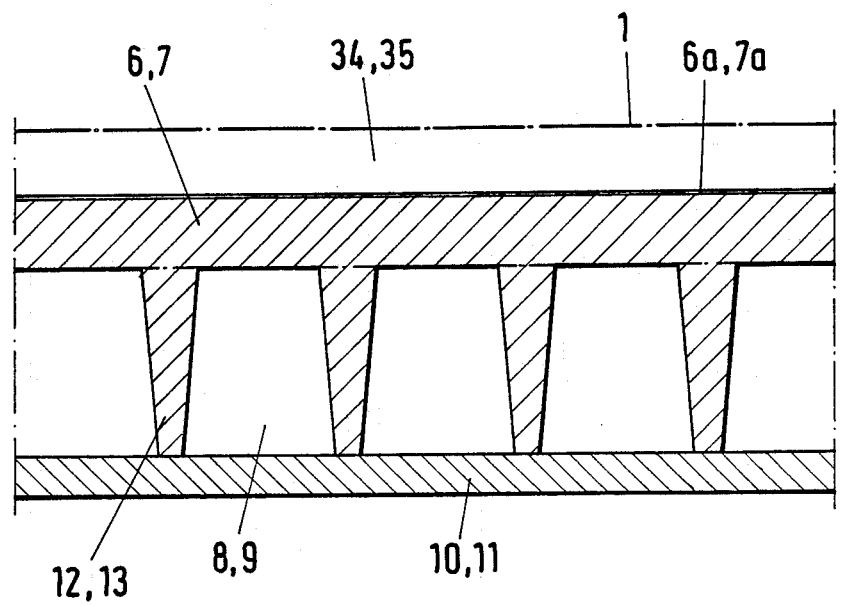
FIG. 7 shows a hot air-heated infrared radiator in cross-section.
Figure 8:
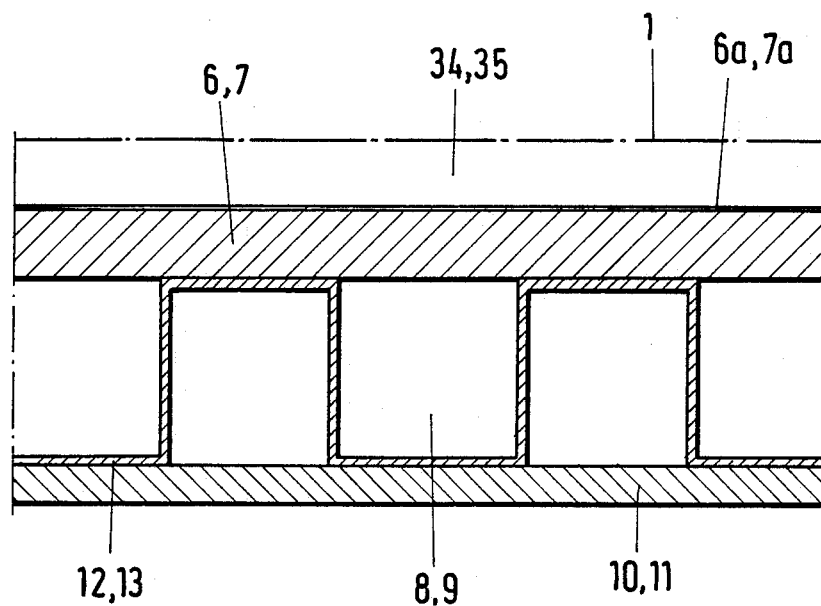
FIG. 8 shows a hot air-heated infrared radiator of a different design to FIG. 7, in cross-section
Figure 9:
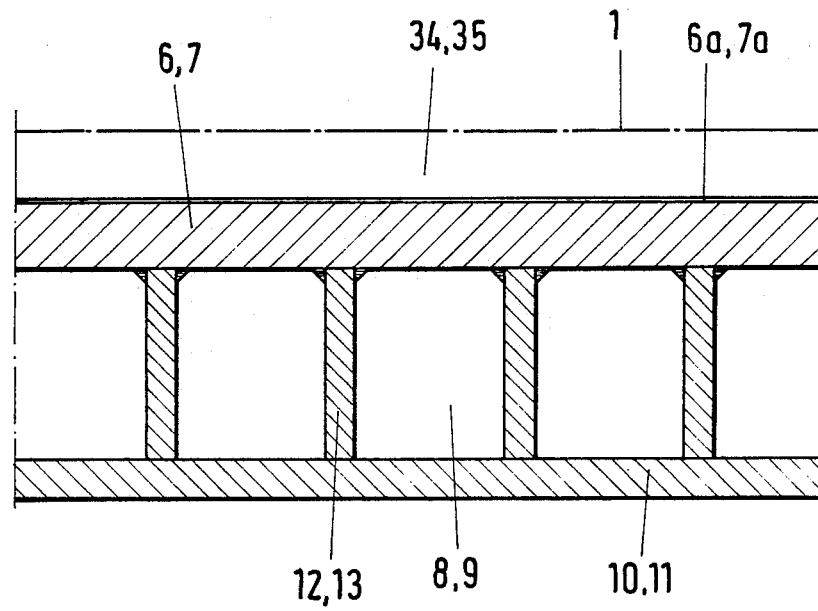
FIG. 9 shows a hot air-heated infrared radiator in a different design from FIGS. 7 and 8, in cross-section.

FIGS. 7, 8 and 9 show in detail represented infrared radiators 6, 7. The radiating plate 6a, 7a radiates through the intermediate space 34, 35 onto the web of material 1. The ducts 8, 9 have the regulated hot air or cold air flowing through them. The plates 10, 11 are located on the rear side. The dividing walls 12, 13 are designed variously, depending on the type of production.

FIG. 7 shows a design which is particularly well suited for production by casting. The dividing walls 12, 13 are conically shaped. Codes of practice set down in the specialized literature (Die Wärmeübertragung durch Rippen,—transmission of Heat by Ribs—VDI journal, vol. 70, 1926, pages 885–889 and 947–951) may be used for the dimensioning of the dividing walls 12, 13. The rear side 10, 11 may consist of insulating material or, in the case of additional heating or cooling from the rear side, of thermally conductive material.

FIG. 8 shows a sheet metal construction, that is a possible design in which the dividing walls can be produced particularly inexpensively. The contact, and thus the heat transfer, between dividing walls and limiting plates is less good, however, than in the case of the cast construction.

FIG. 9 shows a welded construction. This relatively inexpensive solution produces homogeneous radiation values if the dividing walls are welded thermally conductively onto the radiating plate.

We claim:

1. An apparatus for the heat treatment or drying of a web of material (1), comprising guiding and transporting means (2) for the web of material (1) for moving the web in one direction, infrared radiators (6,7) disposed on at least one side of the web of material (1) at a distance therefrom and extending over the width of the web of material and in the longitudinal direction and comprising at least one radiating plate, means forming ducts (8,9) arranged on a rear side of the at least one radiating plate (6a, 7a) for receiving a heating medium flowing therethrough to heat the at least one plate, wherein the means forming the ducts (8, 9) comprises a plurality of elongated hot-air ducts extending closely disposed parallel to one another and extending in the direction of movement of the web of material (1) and control means (37–34), for controlling at least one of flow rate and temperature of hot air in each hot air duct (8, 9).

2. The apparatus according to claim 1, wherein the control means comprises individually operable valves (37–44) provided at least one of an inlet and an outlet of each hot-gas duct (8, 9).

3. The apparatus according to claim 2, wherein the control means comprises at least one of a heating device (53, 54) and a cooling device (55, 56) located at least one of upstream and downstream of the valves (37, 38, 41, 42) at the inlets of the ducts.

4. The apparatus according to claim 3, wherein the heating devices comprise one of infrared radiators, burners and heat exchangers (53, 54) disposed on rear walls (10, 11) of the hot-gas ducts (8, 9).

5. The apparatus according to claim 3, wherein the cooling devices comprise one of cooling air-admitting nozzles and cooling coils on rear walls (10, 11) of the hot-gas ducts (8, 9).

6. The apparatus according to claim 1, wherein the ducts have rear walls and the at least one radiating plate (6a, 7a) comprises the front wall thereof and wherein the front and rear walls comprise one of a closed wall and a fine-meshed screen.

7. The apparatus according to claim 6, wherein the closed wall and the fine-meshed screen consist of one of steel, ceramic and glass.

8. The apparatus according to claim 1, wherein the at least one radiating plate comprises a material having a surface of which radiation in a range of long-wave infrared comes as close as possible to the ideal radiation of a grey body.

9. The apparatus according to claim 6, wherein the front and rear walls comprise a closed wall and webs (ribs 12, 13) of thermally conductive material extending in a longitudinal direction through the hotgas ducts (8, 9) and connected thermally conductively to the front wall.

10. The apparatus according to claim 9, wherein the webs (12, 13) have a conical cross-section, with a broader base connected to the front wall.

11. The apparatus according to claim 9, wherein the rear walls (10, 11) of the hot-gas ducts (8, 9) are connected thermally conductively to the webs (12, 13).

12. The apparatus according to claim 1, further comprising one of a combustion chamber (17) and a heat exchanger (19) for heating gases to be fed to the hot-gas ducts (8, 9).

13. The apparatus according to claim 12, wherein the hot-gas ducts (8, 9) are in a hot-gas circuit with the combustion chamber (17) and the heat exchanger (19).

14. The apparatus according to claim 12, further comprising means forming a duct in an intermediate space (30, 31) between the at least one infrared radiator (6, 7) and the web of material (1) having an inlet connected to a source (39) for gas and an outlet connected to an exhaust-air outlet (36).

15. The apparatus according to claim 14, wherein the combustion chamber (17) or the heat exchanger (19) has an outlet connected to the inlet of the means forming the duct in the intermediate space (30, 31).

16. The apparatus according to claim 14, further comprising a chamber connected to the inlet of the means forming the duct in the intermediate space (30, 31), wherein the atmosphere of the chamber is preheated and cooled by a burner and a heat exchanger (33).

17. The apparatus according to claim 1, further comprising blowing nozzles (6a, 7a) which act on the web of material (1) and are arranged in an intermediate space (30, 31) formed by the web of material (1) and the at least one infrared radiator (6, 7).

* * * * *